July 22, 1924.
A. A. WILSON
1,501,932
DEVICE FOR AUTOMATICALLY CONTROLLING THE TEMPERATURE OF
AUTOMOBILE RADIATORS
Original Filed May 28, 1921    2 Sheets-Sheet 1
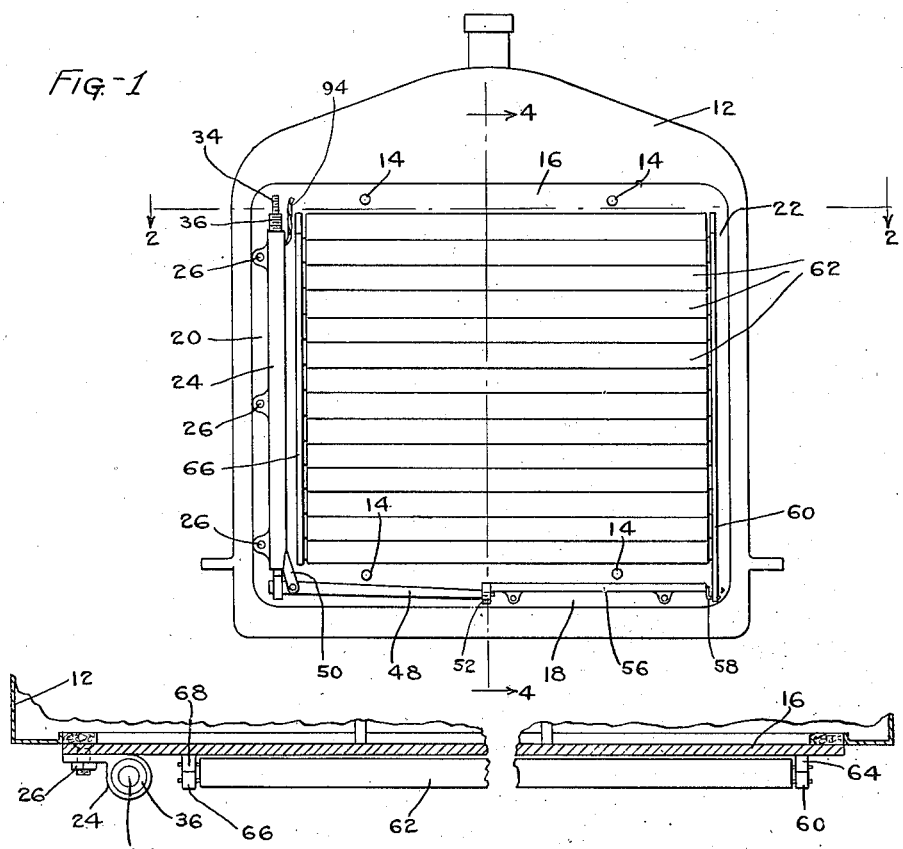
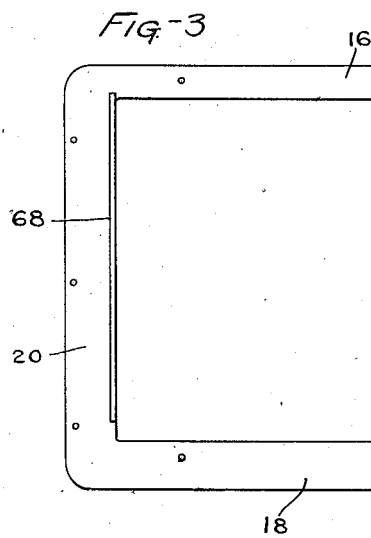
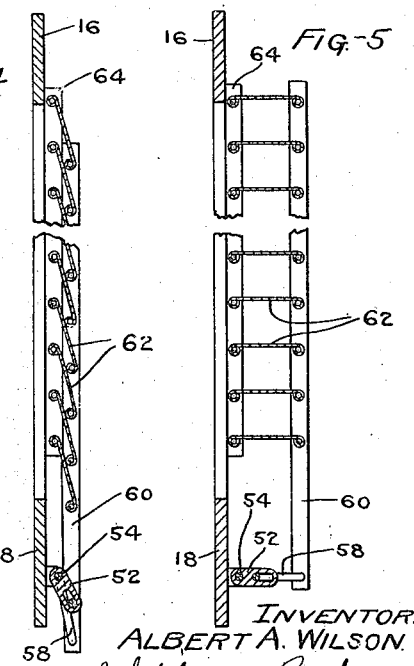
INVENTOR:
ALBERT A. WILSON.
BY Whiteley and Ruckman
ATTORNEYS.

July 22 1924.
A. A. WILSON
1,501,932
DEVICE FOR AUTOMATICALLY CONTROLLING THE TEMPERATURE OF
AUTOMOBILE RADIATORS
Original Filed May 28, 1921
2 Sheets-Sheet 2
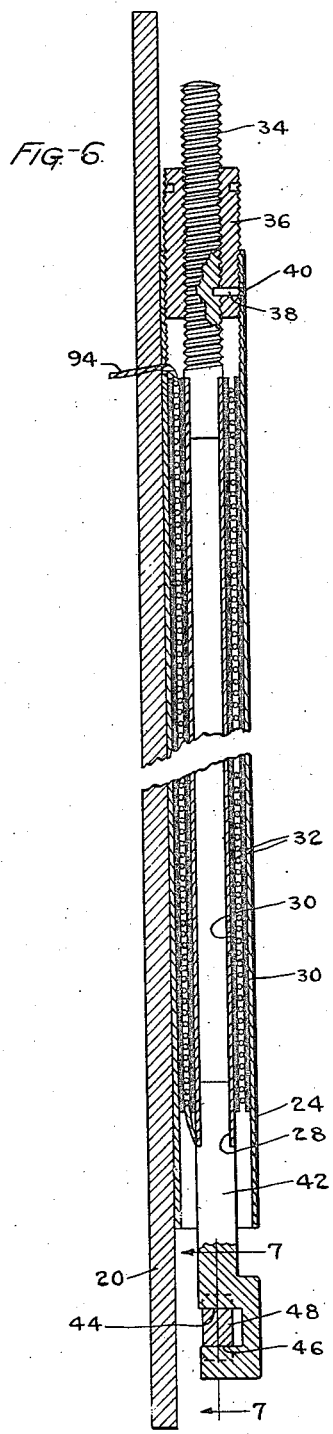
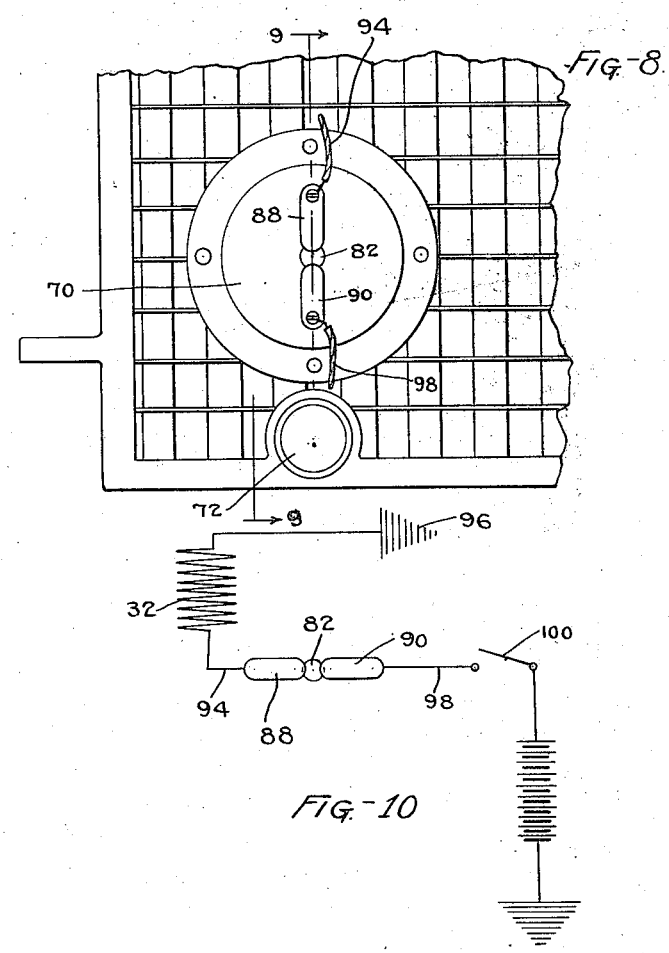
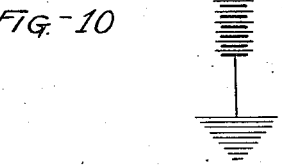
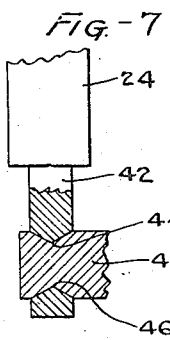
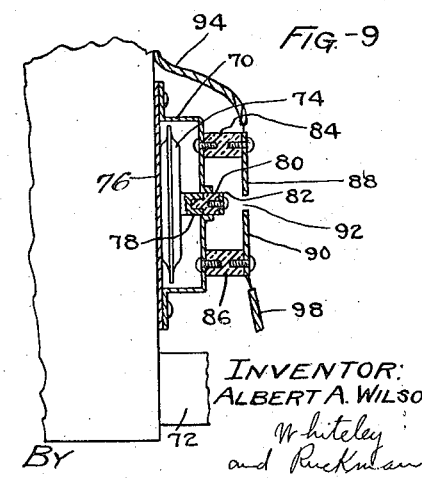

Patented July 22, 1924.

1,501,932

UNITED STATES PATENT OFFICE.

ALBERT A. WILSON, OF MINNEAPOLIS, MINNESOTA.

DEVICE FOR AUTOMATICALLY CONTROLLING THE TEMPERATURE OF AUTOMOBILE RADIATORS.

Application filed May 28, 1921, Serial No. 473,278. Renewed May 14, 1924.

*To all whom it may concern:*

Be it known that I, ALBERT A. WILSON, a citizen of the United States, residing at Minneapolis, in the county of Hennepin and State of Minnesota, have invented certain new and useful Improvements in Devices for Automatically Controlling the Temperature of Automobile Radiators, of which the following is a specification.

My invention relates to devices for automatically controlling the temperature of automobile radiators, and an object is to provide a device of this character which will prevent the passage of cooling air through the radiator until the latter becomes heated to such a degree as to make cooling desirable, and which will then permit the passage of cooling air in amount depending upon the degree to which the temperature rises above a desirable minimum degree. Another object is to provide a device including shutters for the front of the radiator which will be moved into and held in opened or closed position by the action of a thermostat directly connected for operating the shutters in both directions so that they will be opened more or less according to the extent to which the heat of the radiator rises above a desirable minimum degree. Another object is to provide a construction in which the shutters are positively opened and closed by the action of a main thermostat placed in front of the radiator, the action of this thermostat being supplemented by a heat resistance coil in proximity thereto and connected with an auxiliary thermostat located at the lower rear portion of the radiator. Another object is to provide a plurality of shutters for the front of the radiator which are pivotally attached at their front and rear edges in such manner that they will overlap each other when in closed position and will extend horizontally one above the other when in full opened position.

The full objects and advantages of my invention will be apparent from the foregoing description, and the novel features embodied in my inventive idea will be particularly pointed out in the claims.

In the accompanying drawings which illustrate one of the forms in which my invention may be embodied,—

Fig. 1 is a front elevational view showing my device attached to an automobile radiator. Fig. 2 is a view in horizontal section on the line 2--2 of Fig. 1. Fig. 3 is a front view of a frame member which is constructed for attachment in front of the radiator. Fig. 4 is a view in vertical section on the line 4--4 of Fig. 1. Fig. 5 is a view similar to Fig. 4 but showing the shutters in opened, instead of closed, position. Fig. 6 is a view in vertical section through the main thermostat. Fig. 7 is a detail view in section on the line 7--7 of Fig. 6. Fig. 8 is a rear view of the lower portion of the radiator showing an auxiliary thermostat attached thereto. Fig. 9 is a side view of the auxiliary thermostat in section substantially on the line 9--9 of Fig. 8. Fig. 10 is a view showing a wiring diagram.

Referring to the construction shown in the drawings, the numeral 12 designates any customary or suitable radiator casing to which a frame member such as shown in Fig. 3 is secured by bolts 14. This frame member consists of a top portion 16, a bottom portion 18 and opposite side portions 20 and 22, the portion 20 being considerably wider than the portion 22. A tube 24, preferably of steel, is provided with lugs adapted to receive bolts 26 for securing the tube to the frame portion 20. Mounted within the tube 24 is a copper tube 28 which constitutes a thermostatic element and this element is surrounded by insulating material 30 such as asbestos in which is imbedded a resistance coil 32. Extending above and secured at its lower end in the upper end of the tube 28 as by swaging is a threaded rod 34, the threads of which engage internal threads of a sleeve 36 which is externally threaded for engagement with internal threads in the upper end of the tube 24. The external threads of the sleeve 36 are preferably of greater pitch than the internal threads thereof. Upon turning the sleeve 36, the rod 34 and attached thermostatic tube 28 will be moved up or down for adjusting purposes. When the desired adjustment is obtained, the thermostat may be secured by means of a pin 38 passing through the tube 24 and sleeve 36 and extending into the rod 34. The pin may be sealed in place by solder, indicated at 40. Extending below and secured at its upper end in the lower end of the tube 28 as by swaging is a rod 42, the lower end of which is provided with a U-shaped bend, the arms of which on their surfaces which face each other are provided with sharp edges 44 and 46 which fit into V-shaped grooves formed in one end of a bar 48 pivoted to a strap 50 attached to the frame portion 20. The opposite end of the bar 48 is reduced and enters a slot formed in an arm 52 secured to one end of a small rod 54 which extends rotatably through a tube 56 secured to the frame portion 18. The other end of the rod 54 is bent to form a crank arm 58 which passes through a hole in the lower end of a vertical bar 60. The forward edges of a plurality of shutters 62 are pivoted to the bar 60 and the rear edges of these shutters are pivoted to a fin 64 carried by the frame. The shutters at their opposite ends are in similar manner pivoted to a vertical bar 66 and a fin 68 so that the shutters when the thermostat is contracted occupy an overlapping position as shown in Fig. 4 to close the front of the radiator. When the thermostat is fully expanded, the shutters are swung into horizontal position as shown in Fig. 5 and when the thermostat is partly expanded, the shutters will occupy an intermediate position so as to partially close the front of the radiator. The shutters are moved directly by the thermostat in one direction or the other according to the temperature thereof. As shown in Figs. 8 and 9, a casing 70 is secured to the back of the radiator directly above the lower pipe 72 connecting the radiator and engine and this casing contains an auxiliary thermostat 74 in the form of a discoidal receptacle, the front wall of which is secured to a plate 76 forming a portion of the casing 70, this plate being secured to the radiator. The rear wall of the thermostat is provided with a post 78 extending slidably through an opening in the rear wall of the casing. The outer portion of this post consists of insulating material 80 to which is secured a metal contact plate 82. Two posts 84 and 86 of insulating material are attached to the back of the casing 70 and these posts carry contact members 88 and 90, separated by a gap 92 adapted to be closed by the contact plate 82 when the thermostat 74 expands sufficiently for this purpose. The contact member 88 is connected by a wire 94 extending through the radiator with the resistance coil 32 previously referred to, the latter being grounded as shown at 96. The contact member 90 is connected by a wire 98 with the ignition switch 100.

The operation and advantages of my invention will be obvious in connection with the foregoing description. The shutters at the front of the radiator occupy their closed position as shown in Fig. 4 when the water in the radiator is not heated to a degree sufficient to require cooling. As the radiator becomes heated, the thermostatic element 28 on account of being a long tube preferably of copper quickly expands, and by means of its connections with the vertical bar 60 lifts the front edges of the shutters toward the position shown in Fig. 5 to permit the customary fan to draw air through the radiator. It is to be noted that the thermostatic tube 28 is fixed in properly adjusted position at its upper end and its lower end is free to move whereby a thrust or pull is exerted according to whether the tube expands or contracts. The provision of the auxiliary thermostat 74 at the bottom and rear of the radiator renders the device more efficient, especially for winter driving. In addition to being expanded by the heat, at the front of the radiator, the main thermostat is caused to expand by the heat supplied by the resistance coil 32 when the auxiliary thermostat has expanded sufficiently to cause the contact member 82 to bridge the contact members 88 and 90. However, if the auxiliary thermostat fails to function, the main thermostat will expand sufficiently on account of the heat at the front of the radiator to open the shutters before the water in the radiator reaches the boiling point. But it is desirable that the shutters be opened before the water approximates this point, especially in the winter time when an anti-freezing material (such as alcohol) is usually added to the cooling water. Under such condition, it is evident that the cooling mixture should be kept sufficiently cool so that the alcohol which has a lower boiling point than the water will not be boiled off. Furthermore, if the cooling mixture should freeze in the radiator and the opening of the shutters was controlled entirely by the main thermostat, the liquid in the upper portion of the radiator might become heated sufficiently to open the shutters before the liquid in the bottom of the radiator becomes thawed. When the driver stops the car for any considerable time in cold weather, it is desirable that the shutters should close very shortly after stopping in order to retain the heat of the radiator. When the driver opens the ignition switch, the supply of current to the resistance coil 32 is instantly cut off, and on account of the main thermostat consisting of a long tube which is exposed to the cold at a point in front of the radiator, this thermostat quickly contracts sufficiently to close the shutters. The automatic closing of the shutters in this manner is obviously more desirable than the provision of a device to be set manually when the automobile is stopped for insuring closing of the shutters.

I claim:

1. A device for automatically controlling the temperature of automobile radiators comprising a thermostatic tube mounted at the front of the radiator, an auxiliary thermostat mounted on the back of the radiator, connections between said auxiliary thermostat and said thermostatic tube whereby the action of the latter is supplemented; shutters mounted in front of the radiator and connections between said shutters and said thermostatic tube for causing said shutters to open and close.

2. A device for automatically controlling the temperature of automobile radiators comprising a protecting tube secured to the front of the radiator, a thermostatic tube in said protecting tube, a resistance coil surrounding said thermostatic tube between the latter and said protecting tube, an auxiliary thermostat associated with the radiator, means for causing an electric current to flow through said resistance coil when said auxiliary thermostat expands, means for holding one end of said thermostatic tube, shutters mounted in front of the radiator, and connections between said shutters and the other end of said thermostatic tube for causing said shutters to open and close.

3. A device for automatically controlling the temperature of automobile radiators comprising a protecting tube secured to the front of the radiator, a thermostatic tube in said protecting tube, a resistance coil surrounding said thermostatic tube between the latter and said protecting tube, an auxiliary thermostat associated with the radiator, means for connecting said auxiliary thermostat through the ignition switch with a source of electricity, means for connecting said auxiliary thermostat with said resistance coil, shutters mounted in front of the radiator and connections between said shutters and said thermostatic tube for causing said shutters to open and close.

4. A device for automatically controlling the temperature of automobile radiators comprising a vertical protecting tube secured to the front of the radiator, a thermostatic tube in said protecting tube, insulating material between said tubes, a resistance coil imbedded in said insulating material, an auxiliary thermostat associated with the radiator, means for causing an electric current to flow through said resistance coil when said auxiliary thermostat expands, shutters pivotally attached in front of the radiator, a vertical member to which said shutters are pivotally attached, and connections between said member and said thermostatic tube for causing said shutters to open and close.

In testimony whereof I hereunto affix my signature.

ALBERT A. WILSON.